(12) United States Patent
Masterman (10) Patent No.: US 9,008,629 B1
(45) Date of Patent: Apr. 14, 2015

(54) MOBILE NOTIFICATIONS BASED UPON SENSOR DATA

(75) Inventor: Michael F. Masterman, Issaquah, WA (US)

(73) Assignee: Amazon Technologies, Inc., Seattle, WA (US)

( * ) Notice: Subject to any disclaimer, the term of this patent is extended or adjusted under 35 U.S.C. 154(b) by 72 days.

(21) Appl. No.: 13/596,123

(22) Filed: Aug. 28, 2012

(51) Int. Cl.
*H04M 1/725* (2006.01)
*H04W 52/02* (2009.01)

(52) U.S. Cl.
CPC ................................ *H04W 52/0251* (2013.01)

(58) Field of Classification Search
CPC  H04M 19/04;  H04M 1/72529;  H04M 19/041
USPC ................... 455/412.2, 418, 575.2; 709/224; 379/207.03
See application file for complete search history.

(56) References Cited

U.S. PATENT DOCUMENTS

| | | | | |
|---|---|---|---|---|
| 5,794,163 | A * | 8/1998 | Paterson et al. | 455/575.2 |
| 6,650,746 | B1 * | 11/2003 | Groen et al. | 379/207.16 |
| 7,215,887 | B2 * | 5/2007 | Ternullo et al. | 398/118 |
| 8,131,848 | B1 * | 3/2012 | Denise | 709/224 |
| 2008/0267381 | A1 * | 10/2008 | Janssen | 379/207.03 |
| 2010/0075652 | A1 * | 3/2010 | Keskar et al. | 455/418 |
| 2011/0200210 | A1 * | 8/2011 | Kemmochi | 381/107 |

* cited by examiner

*Primary Examiner* — Mahendra Patel
(74) *Attorney, Agent, or Firm* — Thomas | Horstemeyer, LLP (57) ABSTRACT

Disclosed are various embodiments employed to generate device notifications based upon ambient conditions associated with a mobile device. To this end, a request to generate a device notification is obtained from a user application. Notification content is extracted from the request and an escalated or de-escalated notification level is applied that is based at least in part upon the ambient conditions of the mobile device and properties about the ambient conditions that can be identified.

25 Claims, 5 Drawing Sheets

MOBILE NOTIFICATIONS BASED UPON SENSOR DATA

BACKGROUND

Current mobile devices provide for an ability to display notifications that are related to received email, short message service (SMS) messages, mobile application notifications, and other types of content that is pushed to the mobile device and/or pulled by the mobile device and subsequently displayed via some type of notification capability provided by the mobile device operating system. Current mobile device applications and/or operating systems may allow for the ability to filter, categorize and/or prioritize notifications based upon a sender or a message and/or an identity of an application through which a notification originates.

BRIEF DESCRIPTION OF THE DRAWINGS

Many aspects of the present disclosure can be better understood with reference to the following drawings. The components in the drawings are not necessarily to scale, emphasis instead being placed upon clearly illustrating the principles of the disclosure. Moreover, in the drawings, like reference numerals designate corresponding parts throughout the several views.

DETAILED DESCRIPTION

Figure 1:
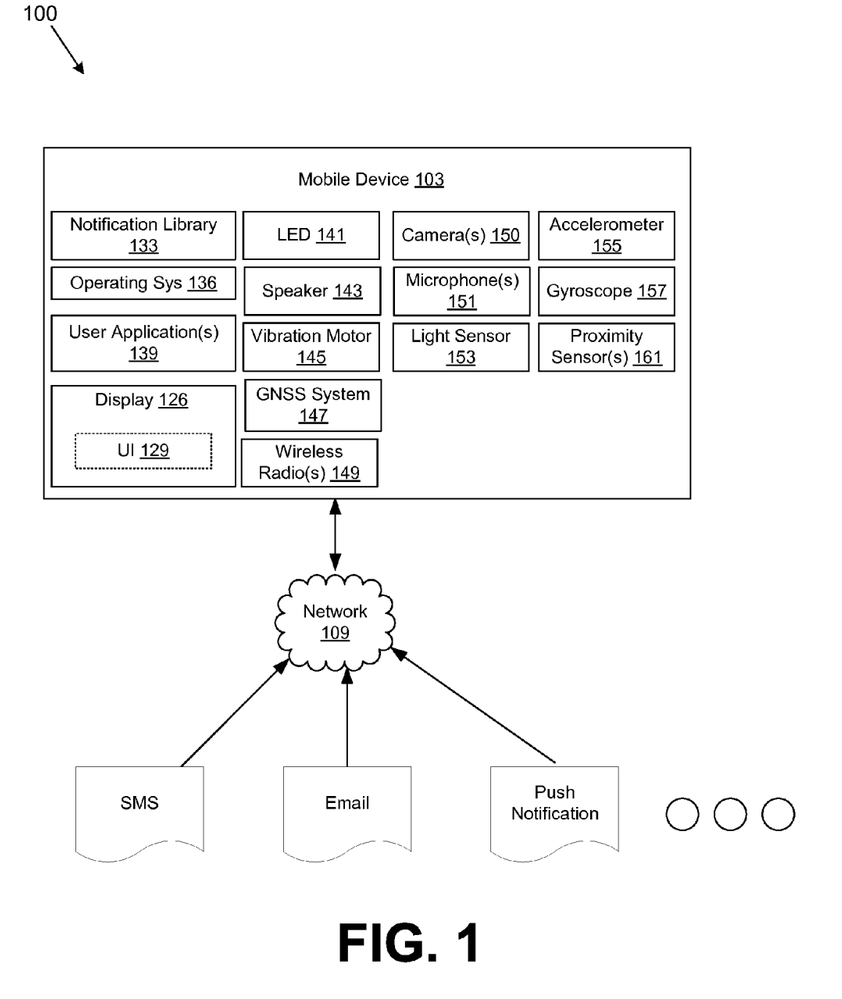
FIG. 1 is a drawing of a networked environment according to an embodiment of the present disclosure.

With reference to FIG. 1, shown is a networked environment 100 that facilitates the use of a mobile device allowing for altering mobile notifications based upon ambient conditions associated with a mobile device based upon input from one or more device sensors and/or data accessible to the mobile device. Specifically, the networked environment 100 includes at least one mobile device 103 in which notifications can be displayed to a user. First, a general description of the physical makeup of the networked environment 100 and its components is described, followed by a discussion of the operation of the same.

To begin, the networked environment 100 includes one or more mobile devices 103 that are coupled to a network 109. The network 109 may comprise, for example, the Internet, intranets, extranets, wide area networks (WANs), local area networks (LANs), wired networks, wireless networks (such as cellular networks), or other suitable networks, etc., or any combination of two or more such networks.

Each of the mobile devices 103 may comprise, for example, a smartphone, tablet computing device, a portable computing system such as, for example, a laptop, or any other device that generally is portable such that an individual may carry such device from place to place as can be appreciated. To this end, according to one embodiment, a mobile device 103 includes a processor circuit having a processor and a memory as can be appreciated.

According to one embodiment, the mobile device 103 includes a display device 126 such as, for example, liquid crystal display (LCD) screens, gas plasma-based flat panel displays, or other types of display devices, etc. The display device 126 included within the mobile device 103 facilitates the display of one or more user interfaces 129 based upon the operation of various applications in the mobile device 103 as will be described. In addition, a mobile device 103 includes various input and output devices such as, for example, a capacitive touchscreen integrated into the display device 126, externally visible lights, light emitting diodes, vibration motors, or other types of visual indicators, an integrated camera, speakers, microphones, and other devices as can be appreciated.

In addition, the mobile device 103 includes various applications and/or systems such as, for example, a notification library 133, an operating system 136, one or more user applications 139, and other applications and/or systems. The notification library 133 is a portion of the operating system 136 and/or an operating system plug-in, application programming interface (API), library, or other type of software component that can facilitate manipulation of device notifications via a user interface, speakers, vibration motors, and/or externally visible indicators such as an externally mounted LED. The operating system 136 is a device operating system that facilitates communication between software components and applications and the mobile device 103 hardware components, such as a processor circuit, input/output bus, input devices, output devices, etc.

User applications 139 represent one or more applications that can be executed by the mobile device 103 and which can obtain various types of data and display notifications in a user interface rendered on the display device or generate other content in the mobile device 103. A user application 139 can comprise an email application, a calendar application, an SMS application, a browser, or any other type of mobile application that can obtain push notifications or generate notifications based upon data obtained via the network 109 or data stored in the mobile device 103. For example, an email or SMS application may generate notifications in the form of an audible ringtone, activation of a vibration motor, a visible notification in a notification bar or other part of an operating system user interface, a flashing or blinking LED or other types of notifications as can be appreciated. In some embodiments, a user application 139 can represent an operating system resource, service, or any type of application that can request to display or activate any type of device notification in the mobile device 103.

As another example, a calendar application may generate notifications associated with appointments or reminders associated with a calendar that are rendered in a user interface shown on the display 126 based upon calendar data stored within the mobile device 103. Additionally, the calendar application may also generate a notification in the form of a ringtone played via a speaker associated with the mobile device 103 or cause an integrated LED to light or blink periodically in one or more different colors. In these and other scenarios where a user application 139 attempts to generate a notification in a mobile device 103, the user applications 139 can do so via an API provided by the notification library 133 by passing a notification data item that contains notification content, meta data (e.g., content type, image capture device type data, location etc.).

The mobile device 103, in one embodiment, further includes various devices sensors and hardware capabilities. For example, the mobile device 103 can include one or more light emitting diodes (LEDs) 141 that can be activated as a part of a notification. The mobile device 103 can also include one or more speakers 143, through which the notification library 133 can play one or more tones or sounds as a part of a notification. Additionally, the mobile device 103 can also include one or more vibration motors 145, which can also be activated by the notification library 133 at various frequencies as a part of a notification.

The various device sensors can provide information about the ambient conditions, locations, and other properties about an environment in which the mobile device 103 is located. The mobile device 103 can include, in some embodiments, a global navigation satellite system 147 that is configured to determine a location of the mobile device 103 by communication with a satellite navigation system, such as the global positioning system (GPS), Globalnaya Navigatsionnaya Sputnikovaya Sistema (GLONASS), or any other satellite navigation system or location detection mechanism. The mobile device 103 can also be configured with one or more wireless radios 149, or wireless network interfaces. For example, the mobile device 103 can include a personal wireless area networking interface, such as a Bluetooth communication subsystem, a wireless networking subsystem such as a wireless local area networking system (e.g., Wi-Fi) facilitating communication with a wireless local area network and/or a wireless wide area networking system facilitating communication with a wireless wide area network.

Location data associated with the mobile device 103 can be requested by the notification library 133 from an operating system executed by the mobile device 103, which can provide location data that is derived from data obtained from the GNSS system 147, the wireless radios 149, or any other systems as can be appreciated.

The mobile device 103 can also be configured with one or more cameras 150. Such a camera 150 can be a front facing camera such that it is aimed in a similar direction that the display 126 is configured to be visible to a user. Such a camera 150 can also be a rear facing camera that is aimed in an opposing direction relative to the display 126. A camera 150 integrated into the mobile device 103 can also comprise one that is configured to capture three dimensional imagery, infrared imagery, or any other type of video capture and/or image capture device.

The mobile device 103 can also be configured with one or more microphones 151 that can capture ambient audio. The one or more microphones 151 can be positioned at various locations within or externally to the mobile device 103. The mobile device 103 can also be configured with one or more light sensors 153 configured to capture information about ambient light levels, such as the ambient light intensity and/or light temperature. The mobile device 103 can also be configured with one or more accelerometers 155 configured to capture acceleration data associated with movement of the mobile device 103. The mobile device 103 can also be configured with one or more gyroscopes 157 configured to capture data regarding spatial orientation of the mobile device 103.

The mobile device 103 can also include one or more proximity sensors 161 that can provide information regarding the physical proximity of the mobile device 103 to other objects. For example, the proximity sensor 161 can be employed to determine whether an object, such as the user's face, is near the display 126 of the mobile device 103, in which case the display can be disabled in the event that the user is engaged voice communications via the mobile device 103.

Accordingly, the notification library 133 can determine, based upon data from the various device sensors, whether a notification rule specifying a particular notification level is associated with the ambient conditions associated with the mobile device 103. The ambient conditions can be related to any sensor data obtained from any of the device sensors of the mobile device 103. For example, the ambient conditions that include ambient sound data captured by the microphone 151, images or video captured by the camera 150, ambient light data captured by the light sensor 153, proximity data captured by the proximity sensor 161, acceleration or movement data captured by the accelerometer 155 and/or position or orientation data captured by the gyroscope 157.

The notification library 133 can also determine, absent an applicable notification rule, whether the notification level corresponding to a particular notification should be modified based upon the ambient conditions of the mobile device 103 and/or device sensor data. It should be appreciated that the ambient conditions detected by the notification library 133 can correspond to instantaneous conditions that are detected at or near the moment that a request to activate a device notification is received. Additionally, the ambient conditions can be based upon sensor data obtained from one or more device sensors over a period of time of any length prior to an including the moment at which a request to activate one or more device notifications is received.

The notification level can comprise one of many various levels of notification depending upon the ambient conditions associated with the mobile device 103. For example, the notification levels associated with the notification library 133 can be ranked according to a degree or amount of device notifications associated with the notification level. In this sense, an escalated notification level can comprise any combination of user interface elements displayed by the notification library 133 in an operating system user interface, audible or tactile notification, and/or LED notifications. Conversely, lower priority notifications can be associated with a de-escalated notification level, which can comprise, for example, a less intrusive form of notification generated by the notification library 133. For example, a de-escalated notification level may be characterized by fewer visual notification elements, less intrusive audible notifications, etc. The notification levels can also include a default notification level with which ambient conditions cannot be associated with an escalated or de-escalated notification level can be associated.

Other solutions generate varying notification levels depending upon a notification type, a sender, and/or originating application of a notification. In contrast, the notification library 133 can maintain one or more notification rules that relate ambient conditions of the mobile device to a notification level. In other words, the notification library 133 can analyze the ambient conditions from device sensor data captured by the various device sensors associated with the mobile device 103 to determine a corresponding notification level. In one scenario, a user application 139 can submit a request to generate a device notification in the form of a notification user interface element that is a popup element and/or one that is placed in a notification bar in an operating system or launcher user interface by submitting a notification data item containing the notification content to the notification library 133. In response, the notification library 133 can analyze the ambient conditions of the mobile device 103 as reported by the various device sensors described above and determine whether a notification rule corresponds to the ambient conditions and specifies a notification level that varies from the notification requested by the user application 139. The notification library 133 can then generate a notification according to the notification level corresponding to the notification rule.

As noted above, the notification level can specify various types of notifications that are displayed by the operating system 136 in a user interface on the display 126, via visible indicators integrated within the mobile device 103, and/or audible alerts via a speaker integrated within the mobile device 103. For example, a user application 139 that is an email application may request a notification in the form of a ringtone, activation of a vibration motor, activation of a certain LED color and repeat pattern and/or frequency, as well as a notification displayed in a notification bar and/or in a notification popup shown in the operating system 136 user interface 129.

However, the notification library 133 may determine that, based upon the ambient conditions of the mobile device 103 as well as potentially a corresponding notification rule, that a different notification level should be employed. Accordingly, if a de-escalated notification level is specified by the notification rule for the ambient conditions, the notification library 133 can generate a device notification that can vary from the type of notification requested by the user application 139. For example, in the case of an email notification, the notification rule can specify that for certain ambient conditions or combinations thereof, that an audible tone should not be generated nor should the vibration motor be vibrated, while the visible notifications in the user interface 129 and LED should be generated.

In some embodiments, selection of a notification level can comprise delaying one or more device notifications until a later point in time. For example, if certain ambient conditions are detected by one or more of the device sensors, the notification library 133 can delay certain device notifications until a later point in time or until the ambient conditions change. As another example, the notification library 133 may suppress and/or deactivate or suppress certain notifications already activated in the mobile device 103 consistent with a de-escalated notification level when certain ambient conditions are detected by one or more of the device sensors until a later point in time or until the ambient conditions change.

The notification rule can specify a notification level that varies from the requested notification in various ways and in various permutations, such as in the form of various volumes or selections of ringtones, a repeat frequency or repeat pattern of a ringtone, vibration motor activation, and/or LED activation, the intensity of the LED activation, and in other combination and permutations as can be appreciated. For example, the notification rule can specify a particular volume of a ringtone that varies from a default volume level. As another example, the notification rule can specify a pattern with which the vibration motor is activated that varies relative to the default pattern. As yet another example, the notification rule can specify a frequency with which the LED is activated that varies from the default frequency. Additionally, the notification rule can specify varying levels of display brightness that can be employed in response to certain ambient conditions.

In some embodiments, a notification rule maintained by the notification library 133 can specify one or more device notifications associated with some characteristic of the ambient conditions of the mobile device 103 that vary from the default notifications that correspond to those requested by the user application 139. For example, an email application may ordinarily request from the notification library a particular combination of default device notifications. Accordingly, a notification rule can specify certain device notifications that are employed in addition to the default notifications. For example, an email application may request to generate device notifications that include the playing of a ringtone, activation of an LED and vibration motor and/or the display of a user interface element. Accordingly, a notification rule can specify that the volume of a default ringtone should be elevated, the frequency with which the LED and/or vibration motor are repeated to be modified, or specify other changes to a default device notification when certain ambient conditions are detected.

In one embodiment, a user of a mobile device 103 may set up various notification rules via a user interface provided by the notification library 133 on the mobile device and/or via a web based user interface. The notification rules can specify a notification level that includes a combination of device notifications that are associated with particular ambient conditions as detected by the one or more of the device sensors of the mobile device 103. In one embodiment, a notification rule can specify that when the ambient audio data is associated with certain characteristics, that notifications received during this time should be escalated or de-escalated.

For example, if ambient audio as captured by the microphone 151 of the mobile device 103 exceed a specified volume level, an escalated notification level can be selected by the notification library 133 for incoming device notifications from user applications 139 or other sources. In one scenario, if a notification request includes a request to play an audible tone, the notification library 133 can select an elevated volume level in such ambient noise conditions. As another example, the notification library 133 can select a de-escalated notification level when ambient sound data captured by the microphone 151 reflects a volume level that is beneath a specified threshold. In one scenario, if a notification request includes a request to play an audible tone, the notification library 133 can select a lowered volume level in such ambient noise conditions. As another example, the notification library 133 can delay the playing of an audible notification tone until ambient sound levels are beneath a specified volume threshold.

As another example, the notification library 133 can also analyze the pitch or other characteristics of ambient sound data and select an escalated and/or de-escalated notification level based upon such an analysis. For example, when a notification request is submitted to the notification library 133, the notification library 133 can examine the pitch of ambient noise data captured by the microphone 151 and play an audible notification tone that has a pitch that varies from the pitch of ambient noise. For example, the notification library 133 can play an audible tone having a pitch such that the tone stands apart from the ambient noise conditions.

As another example, the notification library 133 can detect whether a musical track is present in the ambient noise data captured by the microphone 133. If so, the notification library 133 can select an audible notification tone as a part of a device notification that stands apart from the musical track based upon the tonal or other musical properties of the musical track. Additionally, when the musical track can be identified, the notification library 133 can delay the playing of an audible notification tone until a point in the musical track where volume levels are expected to be low relative to other points in the musical track.

As another example, the notification library 133 can detect whether a an audio track corresponding to video content, such as television programming, advertising content, movies, or any other type of content, is present in the ambient noise data captured by the microphone 133. In such a scenario, the notification library 133 can select an escalated notification level when the ambient audio data corresponds to advertising content and a de-escalated notification level when the ambient audio data corresponds to a television program, movies, or non-advertising content. Additionally, when an audio track corresponding to video content can be identified, the notification library 133 can delay the playing of an audible notification tone until advertising content is detected, or until a commercial starts. In one embodiment, the beginning of advertising content can be detected via detection of commercial break control tones that may be embedded in the audio track accompanying the video content.

As another example, the notification library 133 can be configured to activate audible notification in a device at a volume level at a marginal level above ambient volume levels as detected by the microphone 133. For example, the notification library 133 can be configured to activate audible notifications at a volume level that is a certain constant level above the ambient volume levels of an environment in which the mobile device 103 is located.

The notification library 133 can also perform an analysis of ambient light data obtained from the light sensor 153 of the mobile device 103 and select varying notification levels depending upon the light data. In one embodiment, the notification library 133 can select an escalated notification level the ambient light data reflects a high degree of variation over a specified period of time. In other words, if light levels indicate a high degree of change over a particular period of time, such a condition can be associated with a chaotic environment in which an escalated notification level may be desired. Accordingly, the notification library 133 can employ an escalated volume for audible notifications, activate the vibration motor 145, increase the repeat frequency of the LED 141, or employ any other form of elevated notification level as can be appreciated. As another example, the notification library 133 can select a de-escalated notification level the ambient light data reflects a low degree of variation over a specified period of time.

The notification library 133 can also vary the display brightness and/or LED intensity in response to varying ambient light conditions. For example, the notification library 133 can select an elevated display brightness and/or LED intensity corresponding to a device notification if ambient light data is indicative of a chaotic environment as well as a lowered display brightness if ambient light data is indicative of a lowered display brightness. As another example, the notification library 133 can vary display brightness and/or LED intensity corresponding to a device notification depending upon the ambient light levels detected by the light sensor 153.

The notification library 133 can also perform an analysis of proximity data obtained from the proximity sensor 161 of the mobile device 103 and select varying notification levels depending upon whether the proximity data reflects that the mobile device 103 is within a specified distance of another object. As noted above, the proximity sensor 161 is often employed to determine whether the mobile device 103 is close to the user's face, such as when the user is engaged in a voice call. Accordingly, the notification library 133 can also exploit proximity data obtained from the proximity sensor 161 to select escalated or de-escalated notification levels. For example, if the proximity data reflects that the mobile device 103 is within a specified distance of another object, de-escalated notification levels can be employed, as such a condition may reflect that the mobile device 103 is close to the user. Conversely, if the proximity data reflects that the mobile device 103 is not within a specified distance of another object, an escalated notification levels can be employed, as such a condition may reflect that the mobile device 103 is not near the user's face and/or ears.

The notification library 133 can also perform an analysis of devices to which the mobile device 103 is paired as a part of a wireless personal area network, such as a Bluetooth configuration. For example, the notification library 133 can determine whether the mobile device 103 is paired to a wireless headset or any other type of peripheral. Accordingly, if the mobile device 103 is paired with a headset peripheral, the notification library 133 can determine whether the headset peripheral is connected or disconnected from the mobile device 103 and vary the notification level for incoming notification. For example, if a paired headset peripheral is currently disconnected from the mobile device 103, the notification library 133 can select an escalated notification level, as such a condition may indicate that the user is less likely to notice notification ringtones or other forms of notifications. Conversely, if the paired headset peripheral is currently connected to the mobile device 103, the notification library 133 can select a de-escalated notification level, as such a condition may indicate that the user is more likely to notice notification ringtones or other forms of notifications.

As an additional example, the notification library 133 can also select escalated and/or de-escalated notification levels based upon a signal strength between a peripheral and the mobile device. For example, is the signal strength of a headset peripheral and a mobile device 103 is low, the notification library 133 can escalate visual notifications because it is likely that the user is relatively far away from the mobile device 103 relative to when the signal strength is strong.

The notification library 133 can also perform an analysis of image data and/or video data captured by the camera 150 of the mobile device 103. In one embodiment, the notification library 133 can analyze camera data to assess the environment in which the mobile device 103 is situated. For example, the notification library 133 can initiate an image analysis to determine whether image data captured by the mobile device 103 is located indoors and/or outdoors and select an escalated notification level if the mobile device 103 is located outdoors in a potentially noisy environment. For example, the notification library 133 can initiate an image analysis to determine whether any objects and/or textures can be identified in image data captured by the camera 150 that correspond to typical indoor or outdoor elements. For example, the surface of a desk and/or table, which is an indoor surface upon which a mobile device 103 is often place can be identified in image data and associated with the mobile device 103 being located in an indoor environment. As another example, outdoor features such as the sky, grass, dirt, roads, etc., can be identified in the image data and associated with the mobile device 103 being located in an outdoor environment.

The notification library 133 can also determine a velocity, acceleration, or other movements of the mobile device 103 from data obtained from the GNSS system 147. Accordingly, the notification library 133 can alter notification levels based upon the velocity of the mobile device 103 at any given point in time. If the velocity of the mobile device 103 exceeds a predefined threshold, the notification library 133 can employ escalated notification levels, as an elevated velocity may be consistent with elevated ambient noise levels. Similarly, if the velocity is beneath a threshold or indicates that the mobile device 103 is stationary, the notification library 133 can employ de-escalated notification levels, as such a velocity may be consistent with decreased ambient noise levels. Additionally, a user may specify via a user configured notification rule one or more velocity thresholds and various notification levels with each of the velocity thresholds. Additionally, the notification library 133 can also select escalated notification levels when location data obtained from the GNSS system 147 indicates that the mobile device 103 is located within or near a roadway, airport, or any other similar type of environment that can be associated with elevated noise levels.

The notification library 133 can also generate notification rules by learning what types of notifications are of importance to the user of the mobile device 103. To accomplish this, the notification library 133 can identify a user input in response to a notification that is generated by the notification library 133 and determine whether the user input represents a user interaction or a lack of a user interaction with the notification. If a user interaction with the notification is detected, such as when a user opens a notification or a user application related to the notification, the notification library 133 can generate a notification rule that assigns an escalated notification level to the current ambient conditions of the mobile device 103. If a lack of a user interaction with the notification is detected, such as when a user dismisses or cancels a notification generated by the notification library 133, then the notification library 133 can generate a notification rule that assigns a de-escalated notification level to the current ambient conditions of the mobile device 103.

As another example, the notification library 133 can generate notification rules by determining based upon actions within a user application 139 that the user may take. For example, user interaction with the notification is detected, such as when a user opens a notification related to an email message, SMS message, or any other type of message, and the user subsequently deletes the associated message, the notification library can assign a de-escalated notification level to the ambient conditions of the mobile device 103. Additionally, in this scenario, the notification library 133 can also detect whether the user reads, replies to, or otherwise interacts with the message and assign an escalated notification level to the ambient conditions of the mobile device 103.

Figure 2:
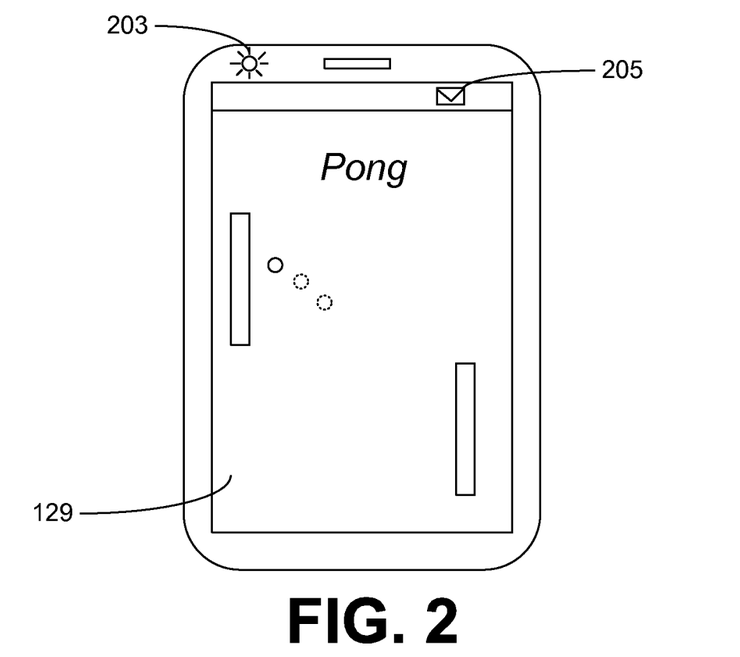
FIGS. 2-4 are drawings of example user interfaces generated in a mobile device according to an embodiment of the present disclosure.

Referring next to FIG. 2, shown is an example of a mobile device 103 displaying a user interface 129 in which various types of notifications can be generated by the notification library 133. In the example of FIG. 2, also shown is an example of an externally visible LED 203 that can be activated by the notification library 133 in response to a request to generate a notification from a user application 139. In the depicted example, a user application 139, such as an email application has requested to generate a notification in the mobile device 103. Accordingly, in the scenario shown in FIG. 2, the user application 139 has requested that the notification include periodic activation of the LED 203 as well as display of a notification badge 205 in a notification area of the user interface 129 and potentially playing of a ringtone associated with the email application. Therefore, in this scenario, the notification library 133 can generate the requested notifications. For example, in this scenario, there may be no predefined notification rules corresponding to the ambient conditions of the device. Therefore, if there are no predefined notification rules corresponding to the ambient conditions, the notification library 133 can generate notification according to a default behavior, which can include generating the notifications requested by the user application 139.

Figure 3:
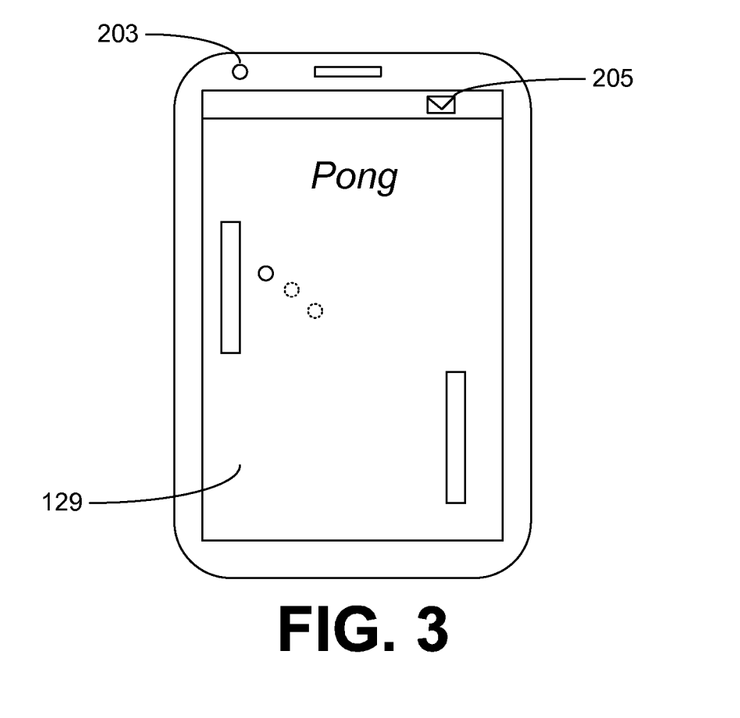

Referring next to FIG. 3, shown is an alternative example of a mobile device 103 and user interface 129 in which the notification library 133 has generated a device notification corresponding to a notification rule. In the depicted example, a notification rule specifying a de-escalated notification level is identified that applies to the current ambient conditions of the mobile device 103. Accordingly, the notification rule can specify that the notification library 133 generates device notifications that vary from those requested by the user application 139. In this example, the notification library 133 can display the notification badge 205 but can also suppress activation of the LED 203 as well as potentially suppress playing of a ringtone.

Figure 4:
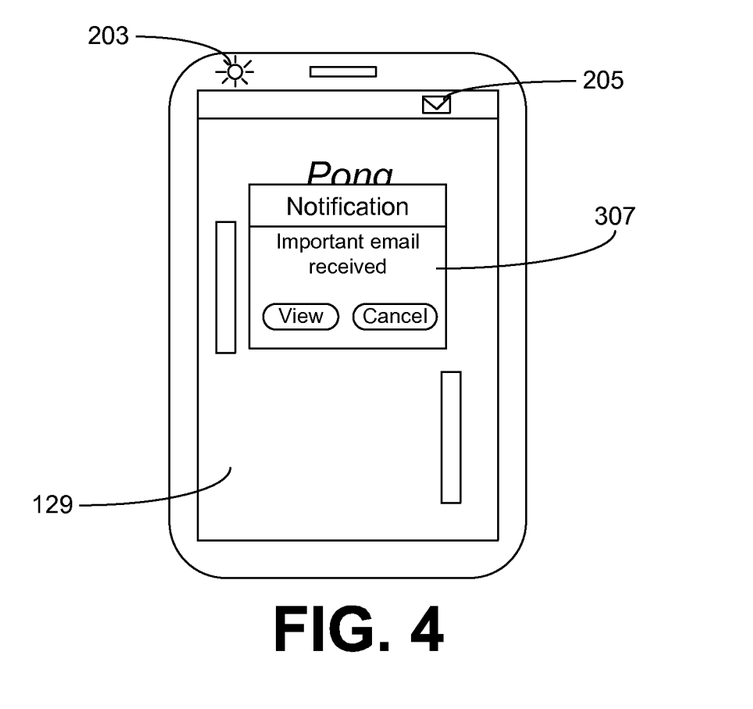

Referring next to FIG. 4, shown is an alternative example of a mobile device 103 and user interface 129 in which the notification library 133 has generated a device notification corresponding to a notification rule. In the depicted example, a notification rule specifying an escalated notification level is identified that applies to the ambient conditions of the mobile device 103. Accordingly, the notification rule can specify that the notification library 133 generates device notifications associated with an escalated notification level. In one embodiment, the escalated notification level includes additional or alternative device notifications that can signal importance of the notification to the user of the mobile device 103. The escalated notification level can include device notifications that vary from those requested by the user application 139.

In this example, the notification library 133 can display the notification badge 205 and activate the LED 203, which may be the device notifications requested by the user application 139. The notification library 133, in order to effectuate an escalated notification level, can also display a popup notification 307 in the user interface 129 that includes user interface elements with which the user may interact. In this example, the popup notification 307 allows the user to dismiss the notification or view additional information related to the notification (e.g., the email message). The notification library 133 can also periodically activate a vibration motor associated with the mobile device until the user interacts with popup notification 307 even though such a notification may not have been requested by the user application 139.

Additionally, the notification library 133 can also refine and/or define notification rules that are related to the ambient conditions of the mobile device 103 based upon user interaction with the popup notification 307. In the depicted example, the notification library 133 can detect user input that corresponds to user interaction with the notification, such as activation of the "View" button. The notification library 133 can also detect user input that corresponds to a lack of user interaction with the notification, such as activation of the "Cancel" button. In the case of detection of user interaction with the notification, the notification library 133 can confirm a notification rule associated with the ambient conditions as well as other device sensor data associated with ambient conditions. The notification library 133 can also adjust the notification rule applying to the ambient conditions to an even more escalated notification level. In the case of detection of a lack of user interaction with the notification, the notification library 133 can adjust the notification rule associated with the ambient conditions so that a de-escalated notification level is applied.

Figure 5:
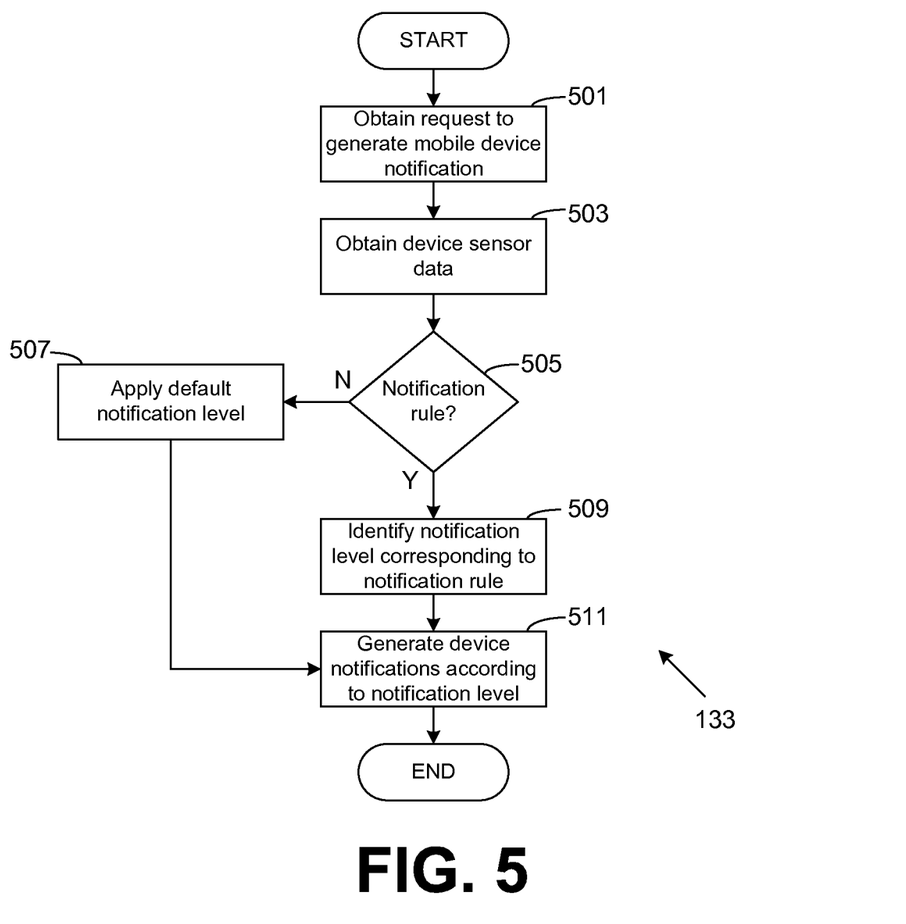
FIG. 5 is a flowchart that illustrates one example of a portion of the operation of the notification library in a mobile device according to an embodiment of the present disclosure.

Referring next to FIG. 5, shown is a flowchart that provides one example of the operation of at least a portion of the notification library 133 according to an embodiment of the present disclosure. Alternatively, the flowchart of FIG. 5 may be viewed as depicting steps of an example of a method implemented in a mobile device 103 (FIG. 1).

Beginning with box 501, the notification library 133 obtains a request from a user application 139 executed by the mobile device 103 to generate one or more device notifications. The request can include a notification data item that includes notification content that is related to the notification or that the user application 139 is attempting to place in a visual notification user interface element. The notification data item also includes the requested types of notification, such as whether to place a notification badge in a user interface, a popup element, LED activation, vibration motor activation, and/or playing of audible alerts or ringtones. As noted above, a user application 139 can include any application executed by the mobile device 103 that initiates notifications in the mobile device 103 that are related to communications (e.g., email, SMS, mobile application push notifications, etc.) obtain on behalf of a user as well as applications that generate notifications related to any other type of content (e.g., calendar applications, games, electronic commerce applications, etc.).

The notification library 133 can then determine obtain device sensor data from one or more of the device sensors to assess the ambient conditions associated with the mobile device 103. As noted above, the notification library 133 can obtain data from one or more device sensors in the mobile device 103, such as the GNSS system 147, one or more of the wireless radios 149, camera 150, microphone 151, light sensor 153, accelerometer 155, gyroscope 157, proximity sensor 161 and any other sensors within or accessible to the mobile device 103 that can capture data associated with ambient conditions. The notification library 133 can request the device sensor data from the various device sensors of the mobile device 103 from an operating system executed by the mobile device 103, which can obtain sensor data and provide the data to the notification library 133.

For example, the notification library 133 can obtain velocity, movement and/or position data associated with the mobile device 103 from the GNSS system 147, accelerometer 155 and/or gyroscope 157 and determine whether movement of the mobile device 103 reflects a likelihood that the mobile device 103 is in a noisy environment. As another example, the notification library 133 can examine audio data captured by the microphone 151 to assess ambient conditions related to ambient noise. The notification library 133 can also examine ambient light data from the light sensor 153, or image and/or video data captured by the camera 150. The notification library 133 can also analyze whether the mobile device 103 is coupled to one or more peripherals via a wireless radio 149 subsystem. As described above, the notification library 133 can analyze any one or any combination of inputs from the various device sensors to assess the ambient conditions of the mobile device 103.

In box 505, the notification library determines whether a notification rule is defined that applies to the ambient conditions as captured by the device sensors. As noted above, in one embodiment, the notification library 133 can determine, based upon the ambient conditions, whether the ambient conditions are likely associated with elevated volume levels. In such a scenario, the notification library can employ an escalated notification level. Alternatively, the notification library 133 may also determine, based upon the ambient conditions, whether the conditions are likely to be associated with lowered volume levels relative to a baseline volume level. In such a scenario, the notification library can employ de-escalated notification levels.

In box 507, the notification library 133 can apply a default notification level if a notification rule is not defined that applies to the ambient conditions. In one embodiment, the default notification level can include generating the notifications requested by the user application 139, taking into account whether the mobile device 103 is in a quiet mode, silent mode, loud mode, or other type of operating system setting that affects the type and/or degree of device notifications desired by the user. In box 509, if a notification rule is identified that corresponds to the ambient conditions, the notification library can then identify a notification level that corresponds to the notification rule. The notification level specified by the notification rule can define various types of device notifications that should be applied. Finally, in box 511, the notification library 133 can cause the device notification specified by the notification level applied to be generated in the mobile device 103.

Figure 6:
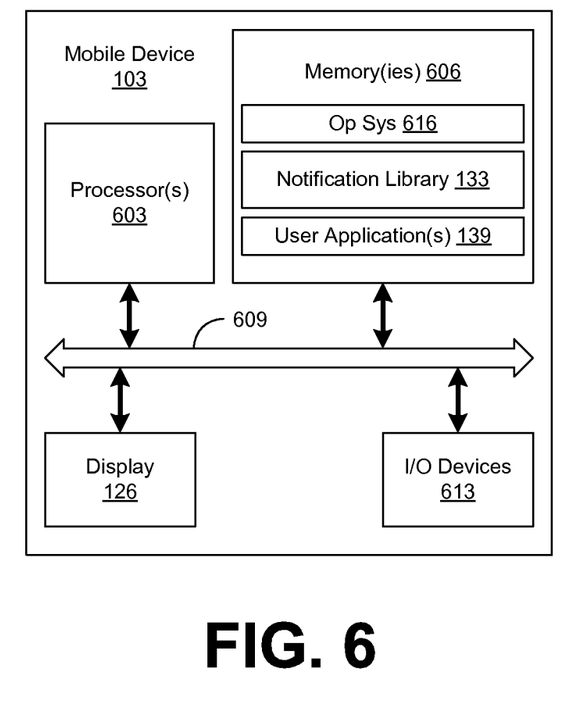
FIG. 6 is a schematic block diagram that depicts one example of a mobile device in the networked environment of FIG. 1 according to an embodiment of the present disclosure.

Referring next to FIG. 6, shown is a schematic block diagram of one example of a mobile device 103 according to an embodiment of the present disclosure. The mobile device 103 includes a processor circuit, for example, having a processor 603 and a memory 606, both of which are coupled to a local interface 609. To this end, the mobile device 103 may comprise, for example, a portable device such as laptop, personal digital assistant, cellular telephone, or other device. The local interface 609 may comprise, for example, a data bus with an accompanying address/control bus or other bus structure as can be appreciated. The mobile device 103 includes the display 126 coupled to the local interface 609 to allow the processor 603 to apply visual data to the display 126. In some embodiments, the mobile device 103 can include other elements that are coupled to the local interface 609, such as a location system configured to obtain location or position data associated with the mobile device 103, and other systems as can be appreciated. In addition, the mobile device 103 includes various input/output devices 613 such as a capacitive touchscreen, toggles, push buttons, microphones, speakers 143, vibration motors 145, LEDs 141, GNSS system 147, wireless radios 149, camera 150, microphone 151, light sensor 153, gyroscope 157, accelerometer 155, proximity sensor 161, other types of wired and/or wireless network interfaces, and other devices that are coupled to the local interface 609.

Stored in the memory 606 are several components that are executable by the processor 603. In particular, stored in the memory 606 are an operating system 616, the notification library 133, one or more user applications 139, and other systems and applications. Also, various data may be stored, for example, in the memory 606, or some other memory accessible to the mobile device 103. It is understood that there may be other applications that are stored in the memory 606 and are executable by the processor 603 as can be appreciated. Where any component discussed herein is implemented in the form of software, any one of a number of programming languages such as, for example, C, C++, Java, Java Script, Perl, Python, Flash, or other programming languages.

A number of software components are stored in the memory 606 and are executable by the processor 603. In this respect, the term "executable" means a program file that is in a form that can ultimately be run by the processor 603. Examples of executable programs may be, for example, a compiled program that can be translated into machine code in a format that can be loaded into a random access portion of the memory 606 and run by a respective processor 603, source code that may be expressed in proper format such as object code that is capable of being loaded into a random access portion of the memory 606 and executed by a processor 603, or source code that may be interpreted by another executable program to generate instructions in a random access portion of the memory 606 to be executed by a processor 603, etc. An executable program may be stored in any portion or component of the memory 606 including, for example, random access memory (RAM), read-only memory (ROM), hard drive, solid-state drive, USB flash drive, memory card, optical disc such as compact disc (CD) or digital versatile disc (DVD), floppy disk, magnetic tape, or other memory components.

The memory 606 is defined herein as both volatile and nonvolatile memory and data storage components. Volatile components are those that do not retain data values upon loss of power. Nonvolatile components are those that retain data upon a loss of power. Thus, the memory 606 may comprise, for example, random access memory (RAM), read-only memory (ROM), hard disk drives, solid-state drives, USB flash drives, memory cards accessed via a memory card reader, floppy disks accessed via an associated floppy disk drive, optical discs accessed via an optical disc drive, magnetic tapes accessed via an appropriate tape drive, and/or other memory components, or a combination of any two or more of these memory components. In addition, the RAM may comprise, for example, static random access memory (SRAM), dynamic random access memory (DRAM), or magnetic random access memory (MRAM) and other such devices. The ROM may comprise, for example, a programmable read-only memory (PROM), an erasable programmable read-only memory (EPROM), an electrically erasable programmable read-only memory (EEPROM), or other like memory device.

In addition, the processor 603 may represent multiple processors and the memory 606 may represent multiple memories that operate in parallel. In such a case, the local interface 609 may be an appropriate network that facilitates communication between any two of the multiple processors, between any processor and any one of the memories, or between any two of the memories etc. The local interface 609 may comprise additional systems designed to coordinate this communication, including, for example, performing load balancing. The processor 603 may be of electrical or of some other available construction.

Although various systems and applications such as the notification library 133 and/or other systems and applications mentioned above may be depicted as being embodied in software or code executed by general purpose hardware such as processor-based systems as discussed above, as an alternative the same may also be embodied in dedicated hardware or a combination of software/general purpose hardware and dedicated hardware. If embodied in dedicated hardware, such systems and applications can be implemented as a circuit or state machine that employs any one of or a combination of a number of technologies. These technologies may include, but are not limited to, discrete logic circuits having logic gates for implementing various logic functions upon an application of one or more data signals, application specific integrated circuits having appropriate logic gates, or other components, etc.

The flowchart of FIG. 5 shows the architecture, functionality, and operation of an implementation of the notification library 133. If embodied in software, each block may represent a module, segment, or portion of code that comprises program instructions to implement the specified logical function(s). The program instructions may be embodied in the form of source code that comprises human-readable statements written in a programming language or machine code that comprises numerical instructions recognizable by a suitable execution system such as a processor in a computer system or other system. The machine code may be converted from the source code, etc. If embodied in hardware, each block may represent a circuit or a number of interconnected circuits to implement the specified logical function(s).

Although the flowchart of FIG. 5 shows a specific order of execution, it is understood that the order of execution may differ from that which is depicted. For example, the order of execution of two or more blocks may be scrambled relative to the order shown. Also, two or more blocks shown in succession in FIG. 5 may be executed concurrently or with partial concurrence. In addition, any number of counters, state variables, warning semaphores, or messages might be added to the logical flow described herein, for purposes of enhanced utility, accounting, performance measurement, or providing troubleshooting aids, etc. It is understood that all such variations are within the scope of the present disclosure.

Also, where various systems and applications described herein such as the notification library 133 and/or other systems and applications comprise software or code, each can be embodied in any computer-readable medium for use by or in connection with an instruction execution system such as, for example, a processor in a computer system or other system. In this sense, such systems or applications may comprise, for example, statements including instructions and declarations that can be fetched from the computer-readable medium and executed by the instruction execution system. In the context of the present disclosure, a "computer-readable medium" can be any medium that can contain, store, or maintain the above-described systems and applications for use by or in connection with the instruction execution system. The computer readable medium can comprise any one of many physical media such as, for example, electronic, magnetic, optical, or semiconductor media. More specific examples of a suitable computer-readable medium would include, but are not limited to, magnetic tapes, magnetic floppy diskettes, magnetic hard drives, memory cards, solid-state drives, Universal Serial Bus (USB) flash drives, or optical discs. Also, the computer-readable medium may be a random access memory (RAM) including, for example, static random access memory (SRAM) and dynamic random access memory (DRAM), or magnetic random access memory (MRAM). In addition, the computer-readable medium may be a read-only memory (ROM), a programmable read-only memory (PROM), an erasable programmable read-only memory (EPROM), an electrically erasable programmable read-only memory (EEPROM), or other type of memory device.

It should be emphasized that the above-described embodiments of the present disclosure are merely possible examples of implementations set forth for a clear understanding of the principles of the disclosure. Many variations and modifications may be made to the above-described embodiment(s) without departing substantially from the spirit and principles of the disclosure. All such modifications and variations are intended to be included herein within the scope of this disclosure and protected by the following claims.

Therefore, the following is claimed:

1. A non-transitory computer-readable medium embodying a program executable in a mobile device associated with a first user, the program, when executed by the mobile device, causing the mobile device to at least:

obtain a request to generate a mobile device notification from a user application executed in the mobile device, the request comprising notification content to be displayed in the mobile device notification, the request further comprising at least one requested notification type comprising at least one of: a request to display a notification in an operating system user interface, a request to activate a light emitting diode (LED) in communication with the mobile device, a request to play a ringtone, or a request to activate a vibration motor associated with the mobile device;

obtain device sensor data associated with ambient conditions, the device sensor data comprising at least one of: ambient sound data captured via a microphone associated with the mobile device, ambient light data associated with a light sensor associated with the mobile device, or movement data associated with an accelerometer associated with the mobile device;

identify a notification level defining at least one notification type comprising at least one of: the request to display the notification in the operating system user interface, the request to activate the LED in communication with the mobile device, the request to play the ringtone, or the request to activate the vibration motor associated with the mobile device;

wherein the notification level is identified as an escalated notification level based at least in part on a determination that a variation in an amount of ambient light captured by the light sensor over a specified period of time satisfies a predefined threshold; and wherein the notification level is identified as a de-escalated notification level based at least in part on a determination that a variation in an amount of ambient light captured by the light sensor over a specified period of time does not satisfy the predefined threshold; and initiate the device notification according to the identified notification level.

2. A computer-implemented method, comprising:

obtaining, in a mobile device, a notification data item associated with at least one application executed by the mobile device;

obtaining, in the mobile device, sensor data from at least one device sensor associated with the mobile device, the sensor data comprising ambient light data from an ambient light sensor;

identifying, in the mobile device, a notification level based at least in part on a variation in an amount of ambient light captured by the ambient light sensor over a specified period of time;

wherein the notification level is identified as an escalated notification level based at least in part on a determination that the variation in an amount of ambient light captured by the ambient light sensor over a specified period of time satisfies a predefined threshold, and wherein the notification level is identified as a de-escalated notification level based in part on a determination that a variation in the amount of ambient light captured by the ambient light sensor over a specified period of time does not satisfy the predefined threshold; and generating, in the mobile device, a device notification corresponding to the identified notification level.

3. The computer-implemented method of claim 2, further comprising:

obtaining, in the mobile device, ambient sound data captured via a microphone associated with the mobile device; and wherein generating the device notification corresponding to the identified notification level further comprises generating at least one of: a notification user interface element rendered on a display device associated with the mobile device, an audible notification via a speaker associated with the mobile device, an activation of a vibration motor associated with the mobile device, or a visual notification via at least one externally visible light emitting diode (LED) associated with the mobile device.

4. The computer-implemented method of claim 3, wherein obtaining the ambient sound data further comprises identifying a first sound characteristic associated with the ambient sound data, the sound characteristic comprising at least one of an ambient volume level or an ambient pitch.

5. The computer-implemented method of claim 4, wherein generating the device notification corresponding to the identified notification level further comprises:

generating the device notification corresponding to the escalated notification level when the ambient volume level exceeds a predefined threshold; and generating the device notification corresponding to the de-escalated notification level when the ambient volume level is beneath a predefined threshold.

6. The computer-implemented method of claim 4, wherein generating the device notification corresponding to the identified notification level further comprises:

generating an audible tone having a second pitch that varies from the ambient pitch.

7. The computer-implemented method of claim 2, further comprising:

obtaining, in the mobile device, ambient sound data captured via a microphone associated with the mobile device; and determining that the ambient sound data contains at least one musical track, and wherein the generating of the device notification corresponding to the identified notification level further comprises generating an audible tone that varies from the at least one musical track.

8. The computer-implemented method of claim 2, further comprising:

obtaining, in the mobile device, ambient sound data captured via a microphone associated with the mobile device; and determining that the ambient sound contains at least one musical track, and wherein the generating of the device notification corresponding to the identified notification level further comprises generating an audible tone during a point in the at least one musical track at which a volume level of the at least one musical track is beneath a predefined threshold.

9. A computer-implemented method, comprising:

obtaining, in a mobile device, a notification data item associated with at least one application executed by a mobile device;

obtaining, in the mobile device, ambient sound data captured via a microphone associated with the mobile device, and determining that the ambient sound data is associated with video content;

obtaining, in the mobile device, sensor data from at least one device sensor associated with the mobile device; and generating, in the mobile device, a device notification corresponding to a notification level based at least in part upon an analysis of the ambient sound data and the sensor data, wherein generating the device notification corresponding to the notification level further comprises:

determining that the video content comprises to advertising content; and selecting an escalated notification level when the video content comprises the advertising content.

10. The computer-implemented method of claim 9, wherein determining that the video content comprises the advertising content further comprises detecting a control tone in the ambient sound data, the control tone being associated with a broadcast commercial break in the video content.

11. The computer-implemented method of claim 2, wherein obtaining the sensor data from the at least one device sensor further comprises obtaining proximity data from a proximity sensor associated with the mobile device, and the generating of the device notification corresponding to the notification level further comprises specifying an escalated notification level when the proximity data indicates an absence of an object within a predetermined radius of the mobile device and specifying a de-escalated notification level when the proximity data indicates a presence of an object within the predetermined radius of the mobile device.

12. The computer-implemented method of claim 2, wherein obtaining the sensor data from the at least one device sensor further comprises obtaining at least one image from at least one camera associated with the mobile device.

13. A system, comprising:
an electronic data store; and
a mobile device in communication with the electronic data store, the mobile device being configured to at least:
obtain a notification request from an application executed in the mobile device to generate a device notification in the mobile device;
obtain ambient condition data from at least one ambient condition component associated with the mobile device;
determine an ambient condition based at least in part upon the ambient condition data, the ambient condition data comprising sensor data, wherein the sensor data comprises ambient light data from an ambient light sensor;
identify a notification level based at least in part upon the ambient condition; and
generate the device notification in the mobile device according to the identified notification level, the identified notification level comprising an escalated notification level when a variation in an amount of ambient light captured by the ambient light sensor over a specified period of time exceeds a predefined threshold.

14. The system of claim 13, wherein the mobile device is further configured to at least obtain the ambient condition data over the specified period of time.

15. The system of claim 13, wherein the mobile device is further configured to at least generate the device notification in the mobile device according to the notification level by delaying the device notification until the ambient condition changes.

16. The system of claim 13, wherein the mobile device is further configured to least determine that a wireless personal area network interface associated with the mobile device is paired with a peripheral, and wherein the identifying of the notification level based at least in part upon the ambient condition further comprises specifying an escalated notification level in response to determining that the peripheral is connected to the mobile device.

17. The system of claim 13, wherein the mobile device is further configured to at least determine that a wireless personal area network interface associated with the mobile device is paired with a peripheral, and wherein the identifying of the notification level based at least in part upon the ambient condition further comprises specifying an escalated notification level based upon a signal strength of a connection between the peripheral and the mobile device.

18. The system of claim 16, wherein specifying the escalated notification level in response to determining that the peripheral is connected to the mobile device further comprises specifying an escalated notification level in response to determining that a headset peripheral is disconnected from the wireless personal area network interface.

19. The system of claim 13, wherein the mobile device is further configured to determine the ambient condition based at least in part upon proximity data generated from a proximity sensor associated with the mobile device, the proximity data indicating that the mobile device is within a specified distance of an object.

20. The system of claim 13, wherein the ambient condition component further comprises an accelerometer associated with the mobile device.

21. The system of claim 13, wherein the ambient condition data further comprises at least one image from at least one camera associated with the mobile device.

22. The system of claim 13, wherein the ambient condition data further comprises ambient sound data from a microphone associated with the mobile device, and the mobile device is further configured to delay the generation of the device notification until a volume level associated with the ambient sound data is beneath a predefined threshold.

23. The system of claim 13, wherein the ambient condition data further comprises ambient sound data from a microphone associated with the mobile device, and the mobile device is further configured to generate the device notification by activating an audible notification at a volume level that is a preconfigured amount above an ambient volume level associated with the ambient sound data.

24. The system of claim 13, wherein the device notification comprises a combination of at least one of: generating a notification user interface element, initiating playing of a ringtone, activating a light emitting diode (LED) integrated with the mobile device, or activating a vibration motor integrated with the mobile device.

25. The system of claim 24, wherein the device notification further comprises at least one of a display brightness, a repeat frequency, a repeat pattern, or an intensity associated with the combination of the at least one of: generating a notification user interface element, initiating playing of a ringtone, activating a light emitting diode (LED) integrated with the mobile device, or activating a vibration motor associated with the mobile device.

* * * * *

UNITED STATES PATENT AND TRADEMARK OFFICE
CERTIFICATE OF CORRECTION

PATENT NO. : 9,008,629 B1
APPLICATION NO. : 13/596123
DATED : April 14, 2015
INVENTOR(S) : Masterman Page 1 of 1

It is certified that error appears in the above-identified patent and that said Letters Patent is hereby corrected as shown below:

In the Claims

At column 16, line 57, in claim 11, delete

"The computer-implemented method of claim 2," and replace with

--The computer-implemented method of claim 9,--

AND

At column 17, line 1, in claim 12, delete

"The computer-implemented method of claim 2," and replace with

--The computer-implemented method of claim 9,--

Signed and Sealed this
Fifth Day of April, 2016

Michelle K. Lee
*Director of the United States Patent and Trademark Office*